United States Patent
Chiu

(10) Patent No.: US 6,205,912 B1
(45) Date of Patent: Mar. 27, 2001

(54) COLLAPSIBLE BARBECUE GRILL

(76) Inventor: Chin-Chung Chiu, No. 47, Tauying Rd., Taoyuan City, Taoyuan (TW)

( * ) Notice: Subject to any disclaimer, the term of this patent is extended or adjusted under 35 U.S.C. 154(b) by 0 days.

(21) Appl. No.: 09/657,231

(22) Filed: Sep. 7, 2000

(51) Int. Cl.[7] .............................. A47J 37/00; A47J 37/07
(52) U.S. Cl. ........................ 99/339; 99/340; 99/400; 99/446; 99/447; 99/448; 99/449; 99/450; 99/482; 126/25 R; 126/9 R
(58) Field of Search ........................... 99/339, 340, 375, 99/400, 401, 444–450, 481, 482; 126/25 R, 9 R, 41 R; 426/523

(56) References Cited

U.S. PATENT DOCUMENTS

| | | | |
|---|---|---|---|
| 3,327,617 | * | 6/1967 | Harlett ............................. 99/446 X |
| 3,769,901 | * | 11/1973 | Phillips ............................ 126/25 R |
| 4,201,125 | * | 5/1980 | Ellis ................................. 99/482 X |
| 4,727,853 | * | 3/1988 | Stephen et al. .................. 126/41 R |
| 4,909,137 | * | 3/1990 | Brugnoli ............................. 99/444 |
| 5,163,359 | * | 11/1992 | McLane, Sr. .................... 99/482 X |
| 5,195,423 | * | 3/1993 | Beller ................................ 99/340 |
| 5,313,877 | * | 5/1994 | Holland .......................... 99/450 X |
| 5,473,980 | * | 12/1995 | Carpenter .......................... 99/446 |
| 5,551,332 | * | 9/1996 | Beatty ............................ 99/400 X |
| 5,603,256 | * | 2/1997 | Charlson et al. ................ 126/25 R |
| 5,718,165 | * | 2/1998 | Winstead ............................ 99/400 |
| 5,782,166 | * | 7/1998 | Lin ................................... 99/340 |

* cited by examiner

*Primary Examiner*—Timothy F. Simone
(74) *Attorney, Agent, or Firm*—Michael D. Bednarek; Shaw Pittman

(57) ABSTRACT

A collapsible barbecue grill includes a tray-like ash/grease catcher having a predetermined depth. The ash/grease catcher is provided at a bottom surface with a pair of wheeled collapsible legs and locating means, along two lateral walls of its top surface with two outward bent edges to provide two supporting frames, and along a rear wall of its top surface with an inward bent edge to provide a baffle, such that a cooking grid having front hooks is removably positioned on and between the two supporting frames and below the baffle. The ash/grease catcher is also provided at an outer front surface with a handle, and near middle points of outer surfaces of its two lateral walls with two bar receivers for a suspension grid set to detachably mount thereto. When the barbecue grill is not in use, the suspension grid set may be disengaged from the bar receivers and received in the ash/grease catcher below the cooking grid and the wheeled legs maybe folded to the bottom of the ash/grease catcher, enabling effortless pull of the collapsed barbecue grill at the handle.

9 Claims, 5 Drawing Sheets

COLLAPSIBLE BARBECUE GRILL

BACKGROUND OF THE INVENTION

The present invention relates to a barbecue grill, and more particularly to a barbecue grill having collapsible and wheeled legs. When the barbecue grill is not in use, components thereof may be disassembled and received in a tray-like ash/grease catcher covered by a cooking grid, so that the whole collapsed barbecue grill can be effortlessly pulled to move.

People living and working in modern cities are frequently under pressure of business and are eager for relaxing outdoor activities on holidays. One of the most popular outdoor activities is barbecue. A barbecue usually needs some appliances designed for this purpose. A simplest barbecue appliance is a single flat grill to be supported on some stones or rocks. It is not always easy to find suitable stones or rocks outdoors for stably supporting the grill. There is developed an improved barbecue grill having a brazier on which a flat grid is supported. With the brazier, people need not to find stones or rocks and therefore save a lot of time and efforts. When the barbecue ends, some people would discard the greasy brazier and grid to save the time and energy for cleaning the same while others would possibly pack the greasy brazier and grid in, for example, plastic bags and bring them home. The brazier and the grid are made of metal material and are therefore very heavy and not easy to convey. The conveying and cleaning of the greasy brazier and grid therefore undesirably forms a burden after the pleasant barbecue.

It is therefore tried by the inventor to develop an improved barbecue grill that includes collapsible legs and an ash/grease catcher adapted to receive therein other components of the barbecue grill, so that the barbecue grill, when it is not in use, can be fully collapsed and conveniently conveyed.

SUMMARY OF THE INVENTION

It is a primary object of the present invention to provide a collapsible barbecue grill that can be fully collapsed into a compact body and effortlessly conveyed.

To achieve the above and other objects, the collapsible barbecue grill of the present invention mainly includes a tray-like ash/grease catcher having a predetermined depth. The ash/grease catcher is provided at a bottom surface with a pair of wheeled collapsible legs and a locating means, along two lateral walls of its top surface with two outward bent edges to provide two supporting frames, and along a rear wall of its top surface with an inward bent edge to provide a baffle, such that a cooking grid having front hooks is removably positioned on and between the two supporting frames and below the baffle. The ash/grease catcher is also provided at an outer front surface with a handle, and near middle points of outer surfaces of its two lateral walls with two bar receivers for a suspension grid set to detachably mount thereto. When the barbecue grill is not in use, the suspension grid set may be disengaged from the bar receivers and received in the ash/grease catcher below the cooking grid and the wheeled legs may be folded to the bottom of the ash/grease catcher, enabling effortless pull of the collapsed barbecue grill at the handle thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
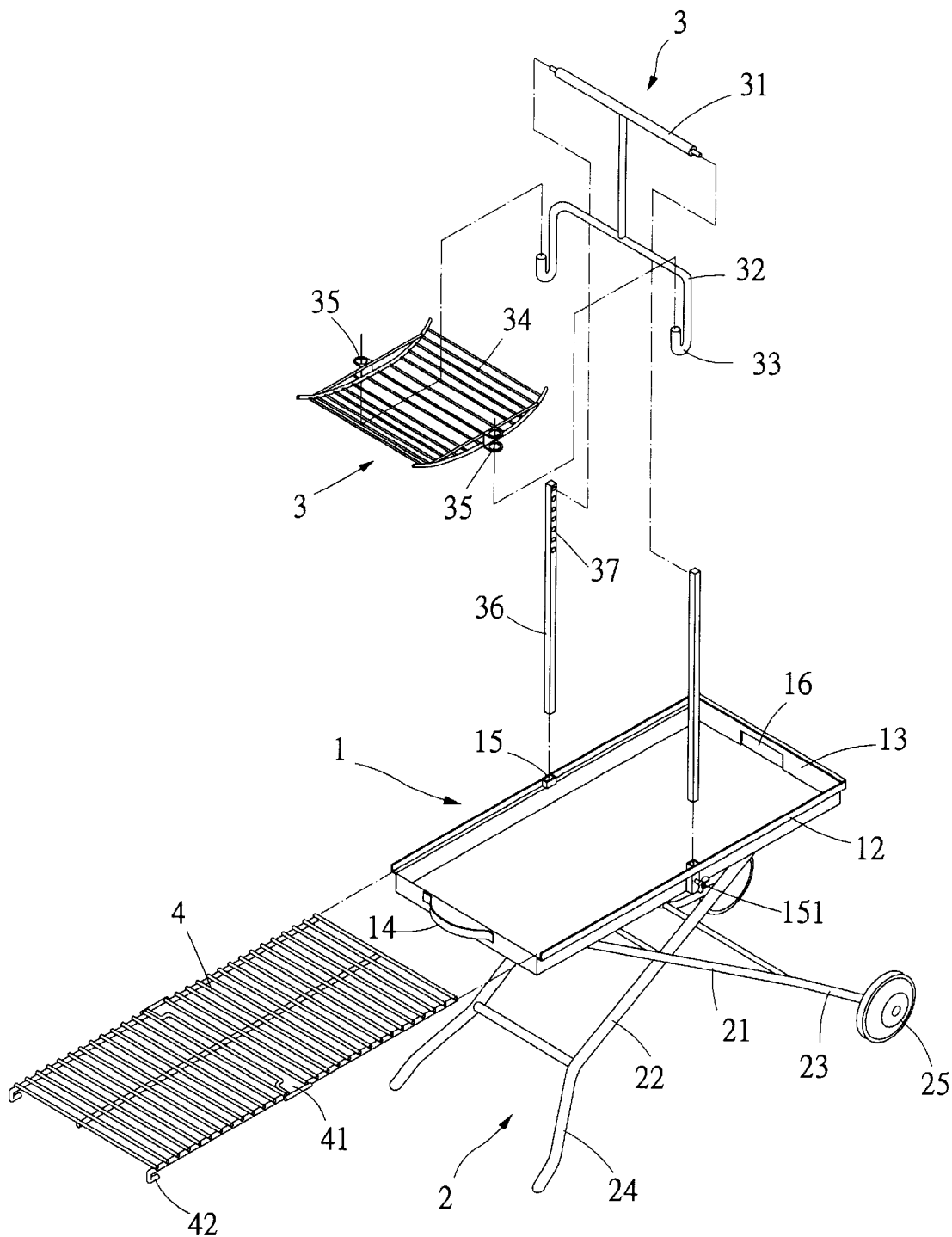
FIG. 1 is an exploded perspective of a collapsible barbecue grill according to the present invention.
Figure 3:
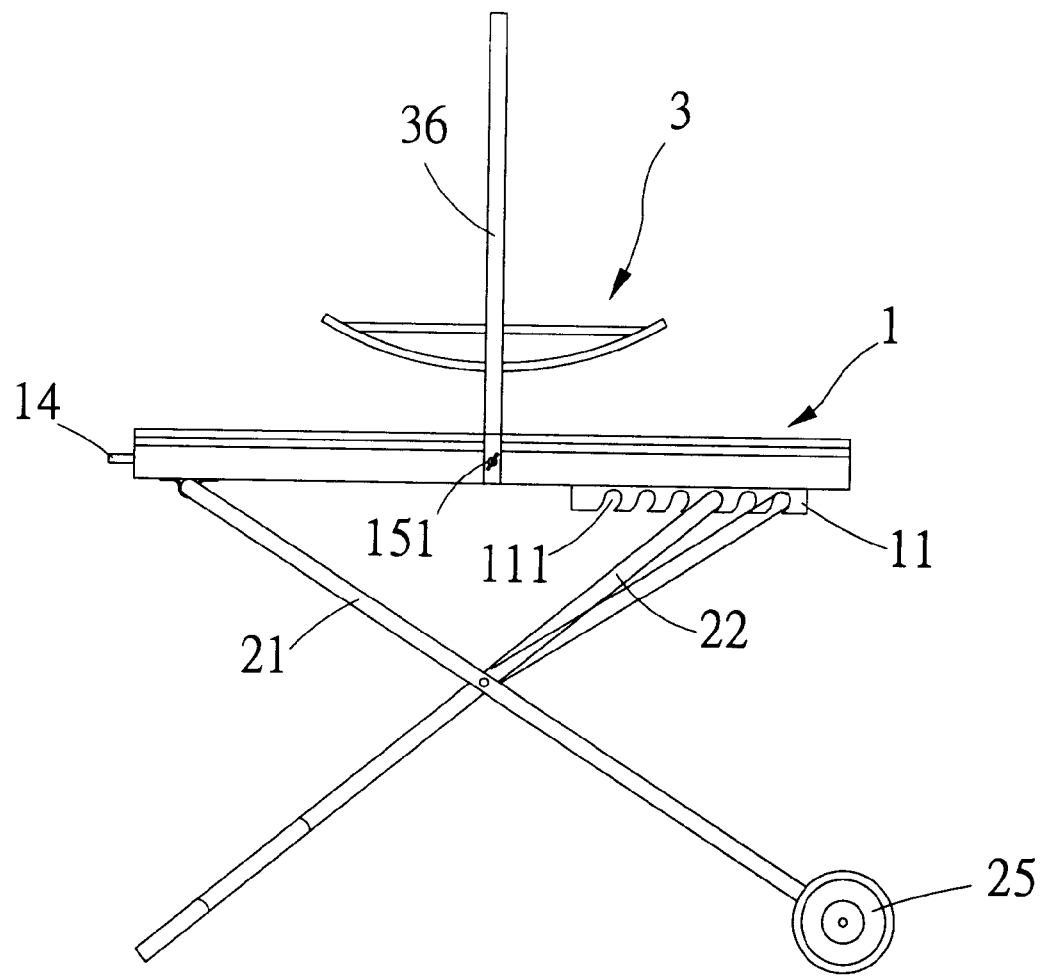
FIG. 3 is an assembled side view of the collapsible barbecue grill of FIG. 1.

Please refer to FIGS. 1 and 3 that are exploded perspective and assembled side views, respectively, of a collapsible barbecue grill of the present invention. As shown, the barbecue grill mainly includes an ash/grease catcher 1, a supporting leg assembly 2, a suspension grid set 3, and a cooking grid 4.

The ash/grease catcher 1 includes a substantially rectangular tray having a predetermined depth. The ash/grease catcher 1 is provided near rear ends of two lateral sides of its bottom surface with two symmetrical locating means 11 having a plurality of downward opened and curved dents 111 (see FIG. 3), along two lateral walls of its top surface with two outward bent edges to provide two symmetrical and generally right-angled supporting frames 12, and along a rear wall of its top surface with an inward bent edge to provide a baffle 13. Moreover, the ash/grease catcher 1 is provided at an outer surface of its front wall with a handle 14, near middle points of outer surfaces of its two lateral walls with two bar receivers 15 each having a bolt 151 adjustably attached thereto, and at a predetermined position of the rear wall with a through hole 16.

The supporting leg assembly 2 includes two generally rectangular frames 21, 22 pivotally connected to each other near their middle points. Two side members of the frames 21 and 22 downward extend to provide two pairs of legs 23 and 24, respectively. The two legs 23 of the frame 21 are provided with two wheels 25, and the two legs 24 of the frame 22 are slightly bent to stretch outward for the supporting legs 2 to more stably stand. And, the frame 21 is pivotally connected at its top to a front end of the bottom surface of the ash/grease catcher 1.

The suspension grid set 3 includes an upper shaft 31, a lower hanger 32, a suspension grid 34, and two height-adjusting bars 36. The lower hanger 32 is formed at two downward extended ends with a hook 33 each and is connected to and below the upper shaft 31 via a vertical link. The suspension grid 34 is a slightly curved member and is provided at two lateral middle points with two retaining holes 35 adapted to engage with the hooks 33 on the hanger 32. The height-adjusting bars 36 are symmetrically provided at inner side surfaces with a plurality of adjusting holes 37 that are adapted to engage with two outer ends of the upper shaft 31. By connecting the upper shaft 31 to different adjusting holes 37 on the height-adjusting bars 36, the suspension grid 34 hooked on the hanger 32 may be located at different height relative to the ash/grease catcher 1.

The cooking grid 4 is sized to match with that of the tray of the ash/grease catcher 1, such that the cooking grid 4 may be fitly laid on and between the two right-angled supporting frames 12 with its rear edge abutting against the rear wall and below the baffle 13 of the ash/grease catcher 1. The cooking grid 4 is provided at two lateral middle points with two openings 41 corresponding to the two bar receivers 15 provided at two lateral walls of the ash/grease catcher 1 for the height-adjusting bars 36 to downward extend therethrough to insert into the two bar receivers 15. The cooking grid 4 is also provided at two front corners with two hooks 42 for engaging with front ends of the right-angled supporting frames 12, so that the cooking grid 4 is firmly seated on and between the right-angled supporting frames 12 to locate above the ash/grease catcher 1.

Figure 2:
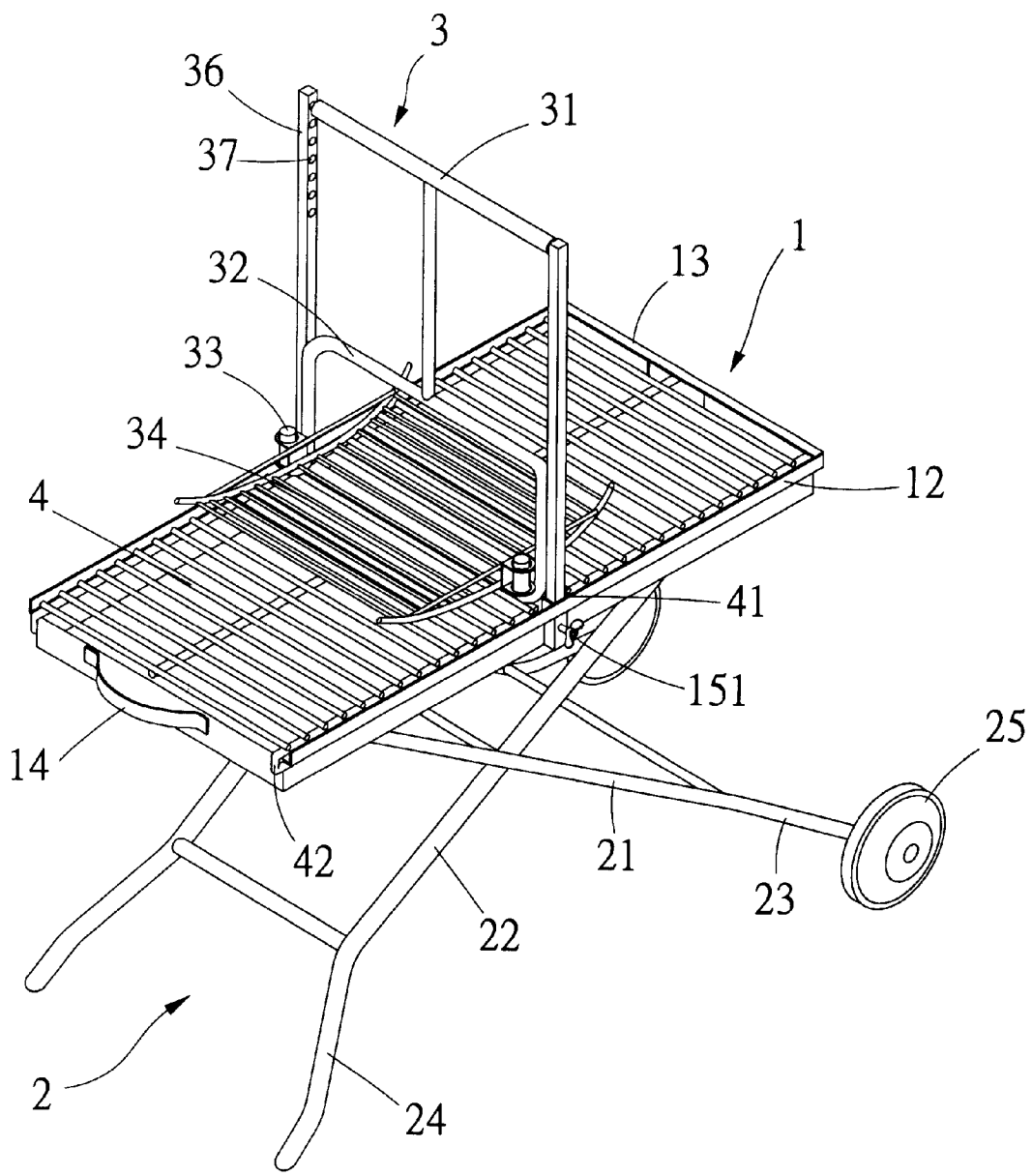
FIG. 2 is an assembled perspective of the collapsible barbecue grill of FIG. 1.

As can be seen from FIGS. 2 and 3, when the collapsible barbecue grill of the present invention is in a fully assembled state, the two right-angled supporting frames 12 and the baffle 13 together restrict the cooking grid 4 to a top of the ash/grease catcher 1; the two hooks 42 provided at two front corners of the cooking grid 4 further enhance the firm location of the cooking grid 4 on the ash/grease catcher 1; the two height-adjusting bars 36 are extended through the two openings 41 to engage their lower ends into the bar receivers 15 and retained thereto by tightening the two bolts 151 against the bar receivers 15; the upper shaft 31 is pivotally connected to and between the two height-adjusting bars 36 by engaging its two outer ends into any pair of the adjusting holes 37 symmetrically provided on inner side surfaces of the bars 36; the curved suspension grid 34 is hooked on the hooks 33 of the hanger 32 to locate and swing above the cooking grid 4 and the ash/grease catcher 1 at a height that is adjustable by engaging the upper shaft 31 with different pair of holes on the height-adjusting bars 36; the frame 21 of the supporting leg assembly 2 is pivotally connected at upper end to a front bottom of the ash/grease catcher 1; and the other frame 22 of the supporting leg assembly 2 is pivotally turned away from the frame 21 to abut its upper end against one of the curved dents 111 of the locating means 11 fixed to a rear bottom of the ash/grease catcher 1. When the curved suspension grid 34 is swung, food positioned there on could be evenly heated. The upper end of the frame 22 may be engaged into different dents 111 of the locating means 11 to enable adjustment of height of the whole barbecue grill relative to the ground, so that a user may select a height most suitable for him or her to cook the food in a most comfortable posture. The ash/grease catcher 1 serves to catch melt fat from the cooked food. By holding the whole barbecue grill at the handle 14 to incline the ash/grease catcher 1 by a suitable angle, ash and melt fat in the ash/grease catcher 1 may be easily discharged from the through hole 16 provided on the rear wall of the ash/grease catcher 1.

Figure 4:
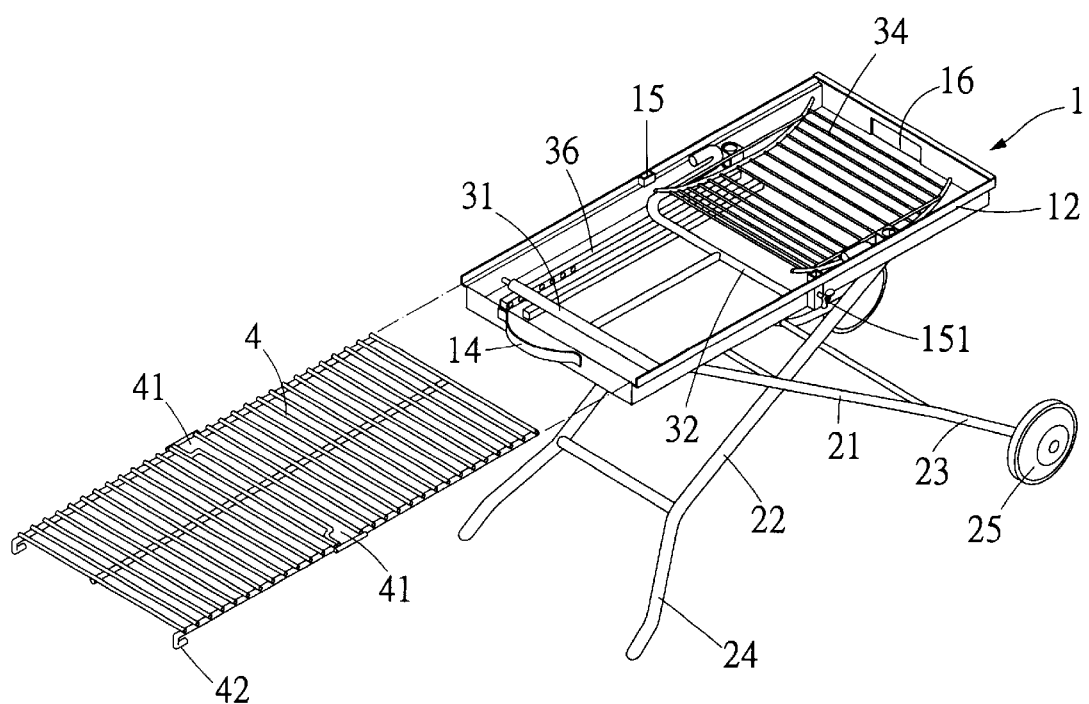
FIG. 4 shows the collapsible barbecue grill is partially collapsed and a suspension grid thereof is received in an ash/grease catcher of the grill when the grill is not in use.
Figure 5:
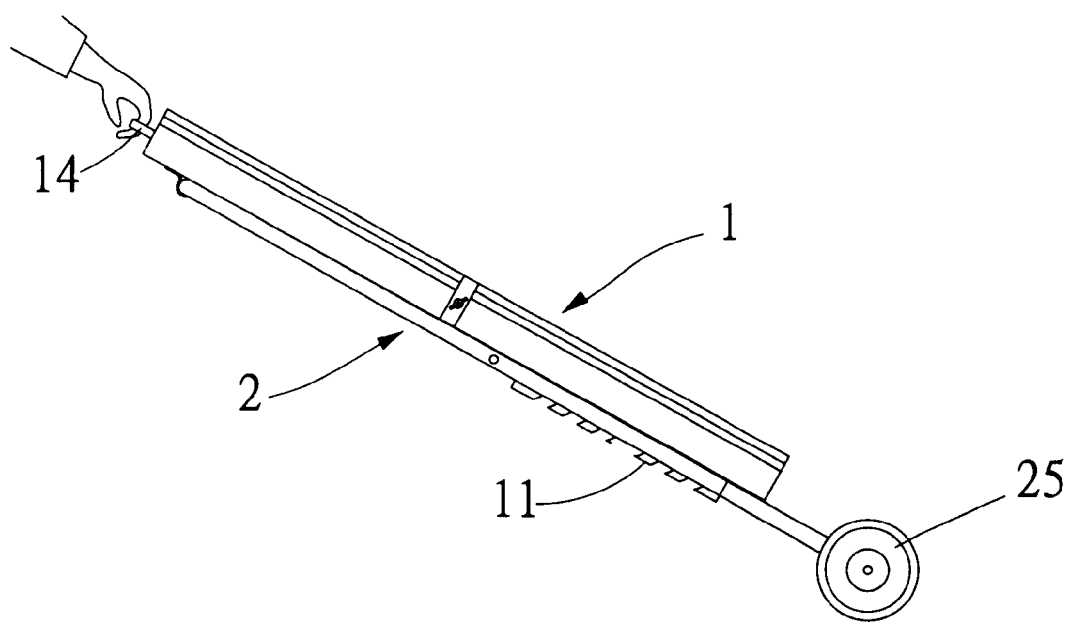
FIG. 5 shows the collapsible barbecue grill of the present invention is fully collapsed and can be moved conveniently.

Please refer to FIGS. 4 and 5 for the steps of collapsing the whole barbecue grill of the present invention. To collapse the barbecue grill, first disengage the whole suspension grid set 3 from the ash/grease catcher 1 and then remove the cooking grid 4 from the supporting frames 12; sequentially put the height-adjusting bars 36, the hanger 32, and the curved suspension grid 34 in the tray of the ash/grease catcher 1 and then put the cooking grid 4 back into the supporting frames 12 and the baffle 13 above the tray of the ash/grease catcher 1; disengage the upper end of the frame 22 of the supporting leg assembly 2 from the dents 111 of the locating means 11 and pivotally turn the frame 22 to closely contact it with the frame 21 and thereby collapses the whole supporting leg assembly 2 for the same to flatly locate below the ash/grease catcher 1; and hold the ash/grease catcher 1 at the handle 14 with the wheels 25 at the lower ends of the frame 21 rotatably contacting with the ground. At this point, the whole barbecue grill is in a fully collapsed state with all components thereof either received in the ash/grease catcher 1 or closely attached to the ash/grease catcher 1, and the collapsed barbecue grill can now be effortlessly conveyed.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A collapsible barbecue grill comprising an ash/grease catcher, said ash/grease catcher including a tray having a predetermined depth, said ash/grease catcher being provided at a bottom surface with a pair of wheeled collapsible legs and locating means, along two lateral walls of its top surface with two outward bent edges to provide two symmetrical supporting frames and along a rear wall of its top surface with an inward bent edge to provide a baffle, such that a cooking grid having front hooks is removably positioned on and between said supporting frames and below said baffle, and said ash/grease catcher being provided at an outer surface of its front wall with a handle, and near middle points of outer surfaces of its two lateral walls with two bar receivers for a suspension grid set to detachably mount thereto;

whereby when said barbecue grill is not in use, it may be collapsed by disengaging said suspension grid set from said bar receivers and confined said suspension grid set in said tray of said ash/grease catcher by said cooking grid, and by folding said wheeled legs to the bottom of said ash/grease catcher to enable effortless pull of said collapsed barbecue grill at said handle provided at the front wall of said ash/grease catcher.

2. A collapsible barbecue grill as claimed in claim 1, wherein said tray of said ash/grease catcher is a substantially rectangular tray.

3. A collapsible barbecue grill as claimed in claim 1, wherein said ash/grease catcher is provided at a top rear wall with a through hole.

4. A collapsible barbecue grill as claimed in claim 1, wherein said locating means includes a plurality of equally spaced and downward opened curved dents.

5. A collapsible barbecue grill as claimed in claim 1, wherein said supporting frames provided at two lateral sides of said ash/grease catcher are generally right-angled frames.

6. A collapsible barbecue grill as claimed in claim 1, wherein said suspension grid set includes two height-adjusting bars, a hanger and a suspension grid.

7. A collapsible barbecue grill as claimed in claim 6, wherein said height-adjusting bars are symmetrically provided at their inner side surfaces with a plurality of adjusting holes.

8. A collapsible barbecue grill as claimed in claim 6, wherein said hanger has an upper shaft connected to a top middle of said hanger via a vertical line, and said hanger being provided at two lower ends with two hooks.

9. A collapsible barbecue grill as claimed in claim 6, wherein said suspension grid is slightly curved and is provided at two lateral middle points with a retaining hole each.

* * * * *